United States Patent [19]
DeRees et al.

[11] Patent Number: 5,906,409
[45] Date of Patent: May 25, 1999

[54] VEHICLE DOOR ASSEMBLY

[75] Inventors: Delbert D. DeRees, Romeo; David J. Kowall, Hartland, both of Mich.

[73] Assignee: Chrysler Corporation, Auburn Hills, Mich.

[21] Appl. No.: 08/673,673

[22] Filed: Jun. 26, 1996

Related U.S. Application Data

[63] Continuation-in-part of application No. 08/470,574, Jun. 6, 1995, abandoned.

[51] Int. Cl.$^6$ ........................................................ B60J 5/00
[52] U.S. Cl. ........................ 296/146.7; 280/751; 296/39.1
[58] Field of Search ................................. 296/153, 146.7, 296/146.5, 39.1, 901, 189; 280/751; 49/502

[56] References Cited

U.S. PATENT DOCUMENTS

| | | | |
|---|---|---|---|
| 3,791,693 | 2/1974 | Hellriegel et al. | 296/146 |
| 3,989,275 | 11/1976 | Finch et al. | 280/751 |
| 4,456,644 | 6/1984 | Janz et al. | 296/153 X |
| 4,945,682 | 8/1990 | Altman et al. | 296/146.5 X |
| 5,004,292 | 4/1991 | Horne | 296/153 |
| 5,040,335 | 8/1991 | Grimes | 49/502 |
| 5,048,234 | 9/1991 | Lau et al. | 49/502 |
| 5,095,659 | 3/1992 | Benoit et al. | 49/502 |
| 5,102,163 | 4/1992 | Ishikawa | 280/751 |
| 5,297,842 | 3/1994 | Hayashi | 296/146.7 |

FOREIGN PATENT DOCUMENTS

| | | | |
|---|---|---|---|
| 0579535A1 | 7/1993 | France . | |
| 2506788 | 8/1976 | Germany | 296/153 |
| 4002242 | 8/1991 | Germany | 296/153 |
| 4002243 | 8/1991 | Germany | 296/153 |
| 67415 | 3/1989 | Japan | 296/153 |
| 122725 | 5/1989 | Japan | 296/39.1 |
| 4-87832 | 3/1992 | Japan . | |
| 4197842 | 7/1992 | Japan . | |
| 5310082 | 11/1993 | Japan . | |
| 5330343 | 12/1993 | Japan . | |
| 406270682 | 9/1994 | Japan | 296/39.1 |

*Primary Examiner*—Joseph D. Pape
*Attorney, Agent, or Firm*—James R. Yee

[57] ABSTRACT

A vehicle door assembly including an outer contoured panel, an inner contoured panel, the panels being connected at their side and bottom edges, and a glass and regulator track assembly adapted to being assembled through the adjacent upper edges of the panels into the space between the panels and secured to the inner panel. A majority of the inner trim is molded integrally as the surface of the inner panel, with a separately applied trim element secured to the upper edge portion of the inner panel, and an arm rest secured to the inner panel at a central portion thereof, where no integrally molded trim exists.

5 Claims, 5 Drawing Sheets

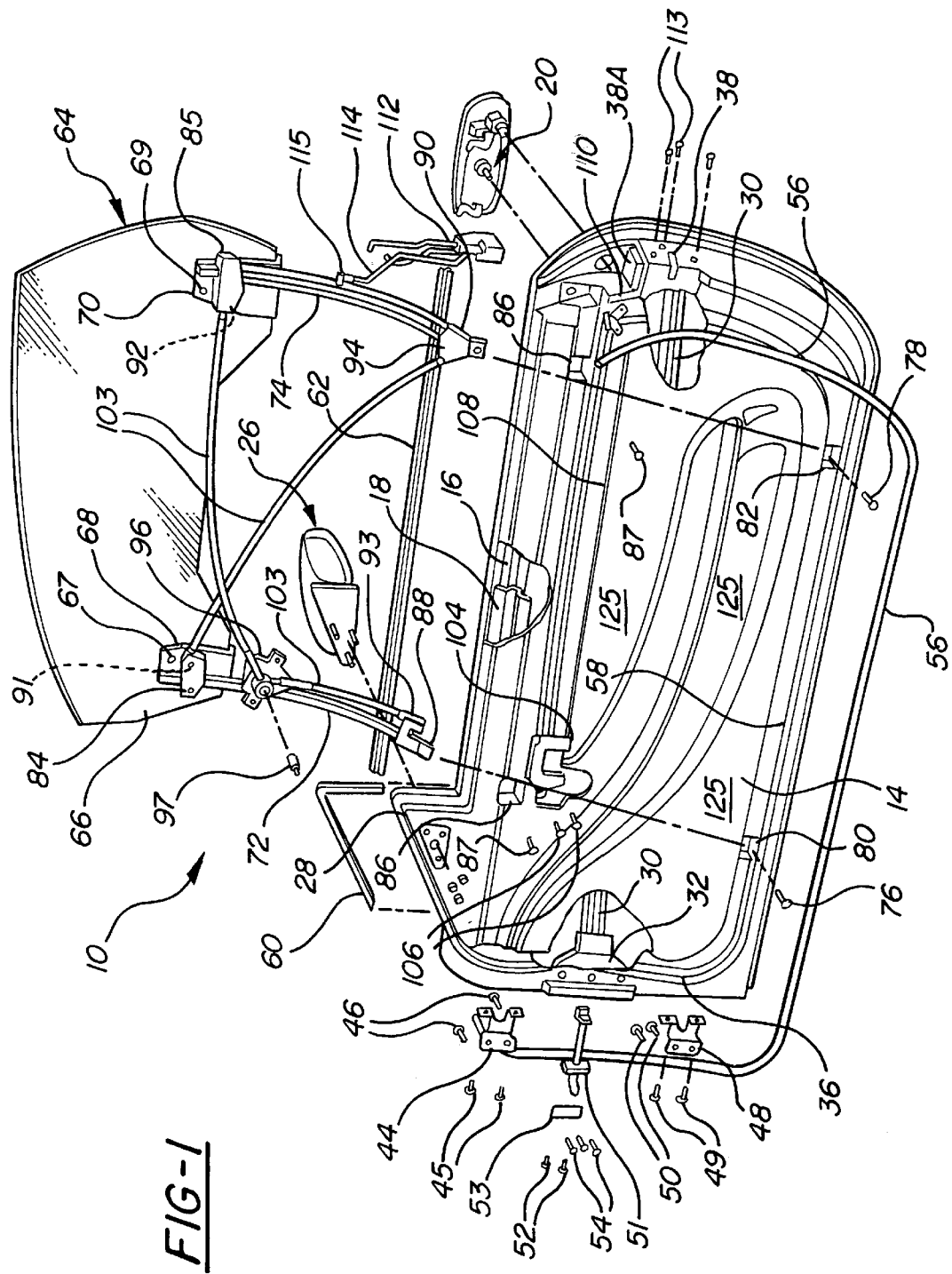

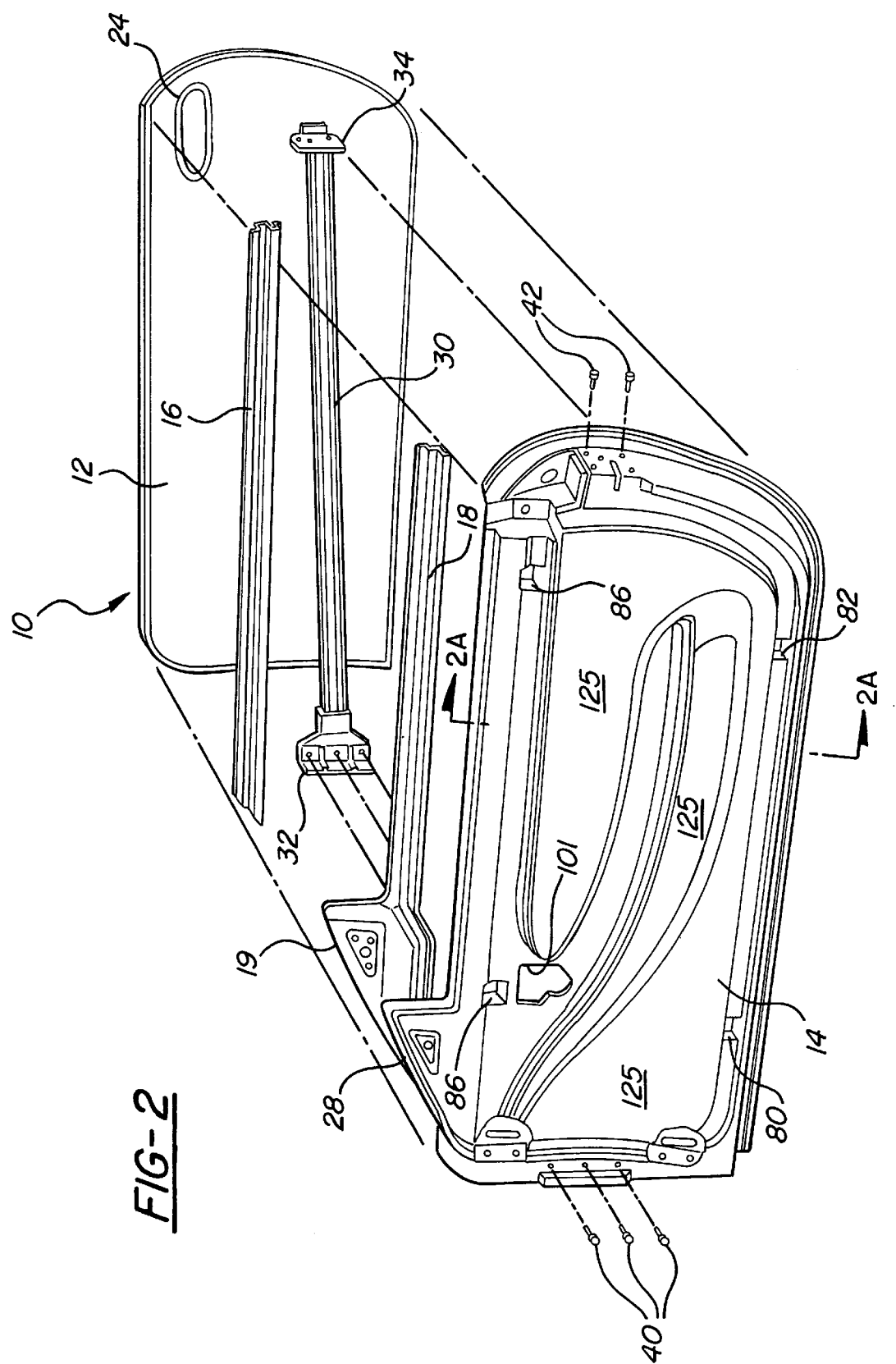

VEHICLE DOOR ASSEMBLY

This is a Continuation-in Part Application of application Ser. No. 08/470,574, filed on Jun. 6, 1995, now abandoned.

TECHNICAL FIELD

This invention relates generally to vehicle door assemblies which are light in weight, low in cost, and readily assembled and serviced and, more particularly, to such assemblies wherein portions of the inner trim are integrally molded on the inner door panel, supplemented by an upper edge trim member including a belt seal assembly, and an arm rest.

BACKGROUND ART

Heretofore, vehicle door assemblies have conventionally included full outer and inner panels, and full interior trim panels, wherein assembly of the interior components is accomplished prior to assembly of the inner door trim panel, and access to the interior components for repair requires removal of the full interior trim panel. Full interior trim panels are disclosed in U.S. Pat. Nos. 3,791,693; 3,989,275; 5,040,335; 5,048,234; 5,095,659; 5,102,163; and 5,297,842; in Japanese patent nos. 4-87832; 4-197842; 5-310082; and 5-330343; and in European publication 0 579 535 A1.

Japanese patent no. 5-330343 discloses an inner door panel having first molded trim panel mounted thereon, a separate trim panel mounted on the latter, and an arm rest mounted on the separate panel.

Grimes U.S. Pat. No. 5,040,335 discloses an inner substrate covered by a foam backing layer, which is, in turn, covered by an inner shell.

DISCLOSURE OF THE INVENTION

A general object of the invention is to provide an improved vehicle door assembly;

Another object of the invention is to provide an improved door assembly, particularly with respect to the inner trim thereof.

A further object of the invention is to provide a door assembly including an outer contoured panel and an inner contoured panel connected at their front and rear sides and bottom edges, and wherein access to the latch, outside handle, key cylinder, and linkage is through a latch cover mounted on the inner panel; and access to the mirror assembly, inside handle, and regulator mounting is through the belt-line trim panel; the end result being reduced weight and cost, and less time required for assembly and service.

Still another object of the invention is to provide a vehicle door assembly wherein a major portion of the door trim is integrally molded into the inner panel surface, with only a small added portion of trim, including an upper edge glass sealing portion and an arm rest, being required.

These and other objects and advantages will become apparent when reference is made to the following drawings and the accompanying description.

BRIEF DESCRIPTION OF THE DRAWINGS

FIG. 1 is an exploded perspective view of the inventive door assembly, less the interior trim;

FIG. 2 is an exploded perspective view of components of the inventive door assembly;

BEST MODE OF CARRYING OUT THE INVENTION

Figure 2A:
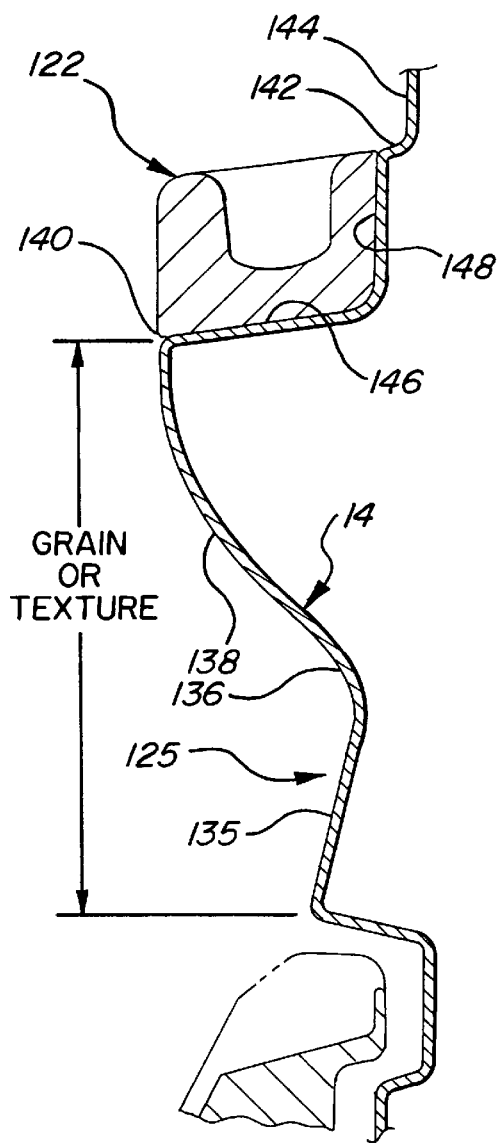
FIG. 2A is an enlarged cross sectional view taken along the plane of the line 2A—2A of FIG. 2, and looking in the direction of the arrows.

Referring now to the drawings in greater detail, FIGS. 1 and 2 illustrate a door assembly 10 including a composite. contoured outer panel 12 and a composite contoured inner panel 14 adapted to being interconnected at their outer peripheral sides and bottom edges. The composite contoured inner panel 14 includes integrally molded trim portions, as will be explained. In between the upper peripheral edges are mating composite outer door and belt reinforcement and composite inner door and belt. reinforcement members 16 and 18, respectively. The member 18 includes an upwardly extending portion 19.

An outside door handle and key cylinder assembly 20 is (FIG. 1) adapted to be mounted on a rear open portion 24 (FIG. 2) of the outer panel 12. An outside mirror assembly 26 (FIG. 1) is secured to the upwardly extending portion 19 and to a front upwardly extended portion 28 of the inner door and belt. reinforcement member 18.

A structural impact beam 30 (FIG. 2) extends longitudinally between the outer and inner panels 12 and 14, and. includes a front longitudinally oriented mounting plate 32 (FIGS. 1 and 2) and a rear laterally oriented mounting plate 34 (FIG. 2) for mounting respectively on a front end wall 36 (FIG. 1) and a rear end wall 38 of the contoured inner panel 14, being secured thereto by suitable fasteners 40 (FIG. 2) and 42, respectively. The perpendicular relationship of the beam 30 opposite end fastening technique serves to add rigidity to the side impact structure.

An upper door hinge assembly 44 is secured by fasteners 45 to the upper portion of the front end wall 36, and by fasteners 46 to a front vehicle pillar (not shown). A lower door hinge assembly 48 (FIG. 1) is secured by fasteners 49 to the lower portion of the front end wall 36, and by suitable fasteners 50 (FIG. 1) to the front vehicle pillar 47. A check strap assembly 51 (FIG. 1) is secured by fasteners 52 to a bracket 53, which is attached to the intermediate portion of the front end wall 36 by fasteners 54.

A long seal strip 56 (FIG. 1) mounts around the edge of the front end wall 36, a bottom surface 58, and the rear end wall 38. A short seal strip 60 mounts around the edge of the front upwardly extended portion 28 of the inner door and belt reinforcement member 19. A glass and belt outer seal assembly 62 extends across the upper edge of the outer door panel 12.

A glass and regulator track assembly 64 is adapted to being loaded through the belt-line. The assembly 64 includes a window glass 66 secured at the lower front portion thereof by a fastener 67 to a lift plate 68 (FIG. 1), and at the lower rear portion thereof by a fastener 69 to a lift plate 70 (FIG. 1). The lift plates 68 and 70 are slidably mounted in respective vertically oriented tracks 72 and 74 by slide projections (not shown). The tracks 72 and 74 are secured by fasteners 76 and 78 at their lower ends in mounting recesses 80 (FIG. 1) and 82 (FIG. 1) formed in the bottom surface 58 of the inner panel 14. Front and rear upper regulator housings 84 and 85, respectively, are secured at upper front and rear ends of the tracks 72 and 74 in two mounting recesses 86 in the inner panel 14 by fasteners 87 (FIG. 1). Front and rear lower regulator housings 88 and 90 are secured at lower front and rear ends of the tracks 72 and 74. As shown in FIG. 1, fixed drums 91, 92, 93 and 94 are secured. in the respective housings 84, 88, 85 and 90.

A crank assembly 96 (FIG. 3) including a crank arm stem 97, a crank arm 98, and an inner drum (not shown) is secured, by fasteners 100 to the inner panel 14 through an opening 101 (FIG. 2). A cable 102 extends through a series of sheaths 103 from around the drum of the crank assembly 96 downwardly around the lower front drum 93, upwardly around the upper front drum 91, laterally and downwardly around the lower rear drum 94, upwardly around the upper rear drum 92, and laterally back to the drum of the crank assembly 96 for moving the lift plates 68 and 70 and their associated window 66 up and down by the crank arm 98. An inside door handle assembly 104 (FIG. 1) is secured by fasteners 106 to the inner panel 14.

Figure 2B:
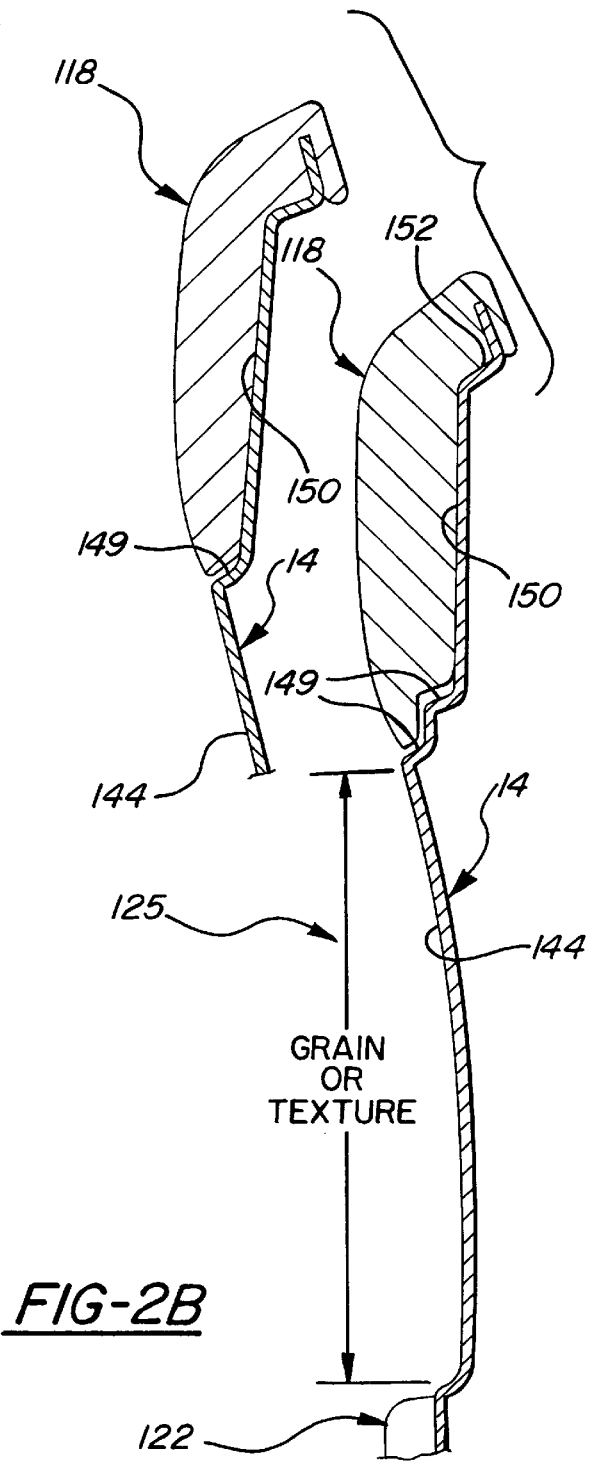
FIG. 2B is a fragmentary cross sectional view illustrating a modification of a portion of the FIG. 2A structure.
Figure 3:
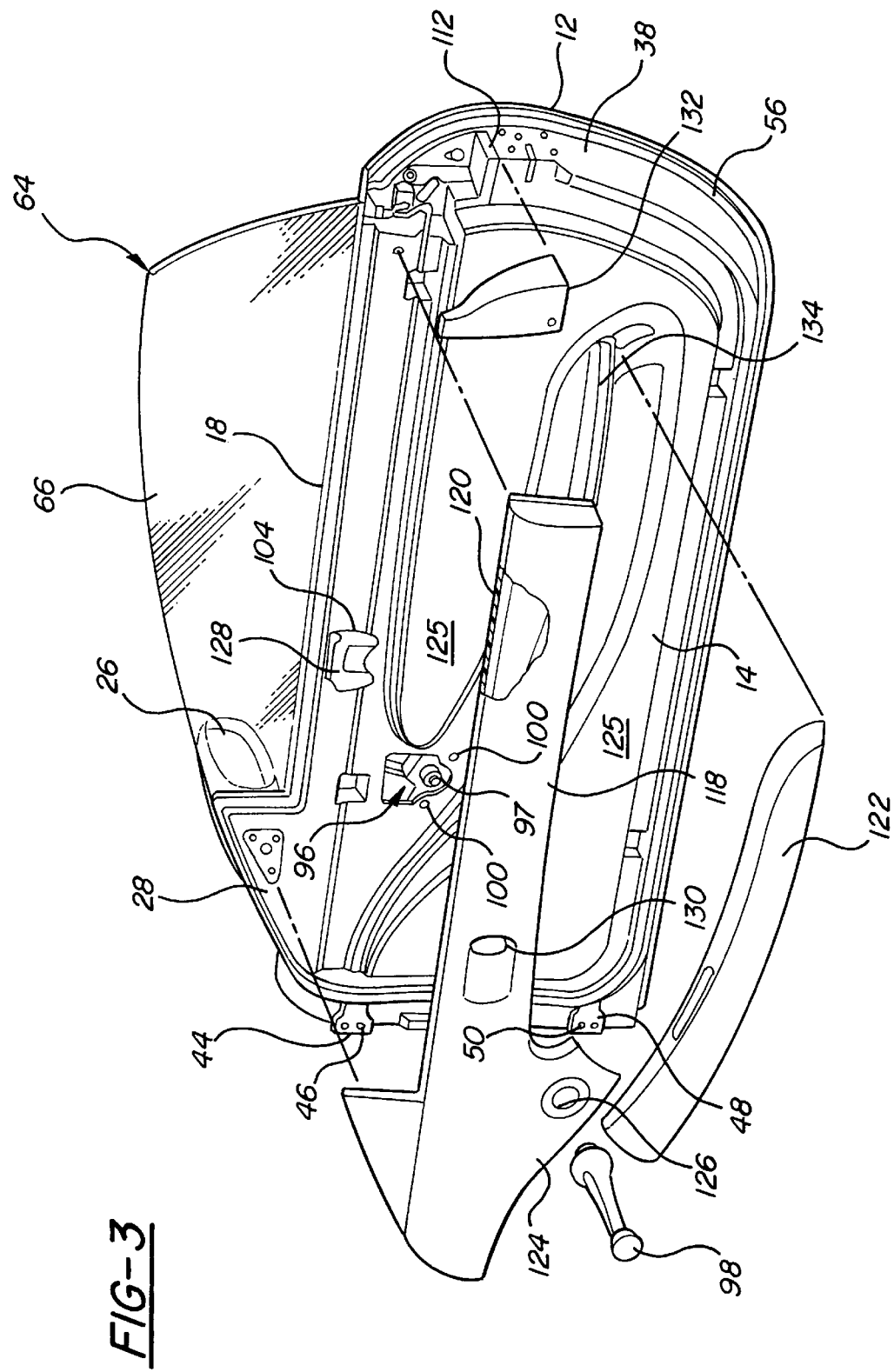
FIG. 3 is a perspective view of the assembled door, with the trim components exploded therefrom.
Figure 4:
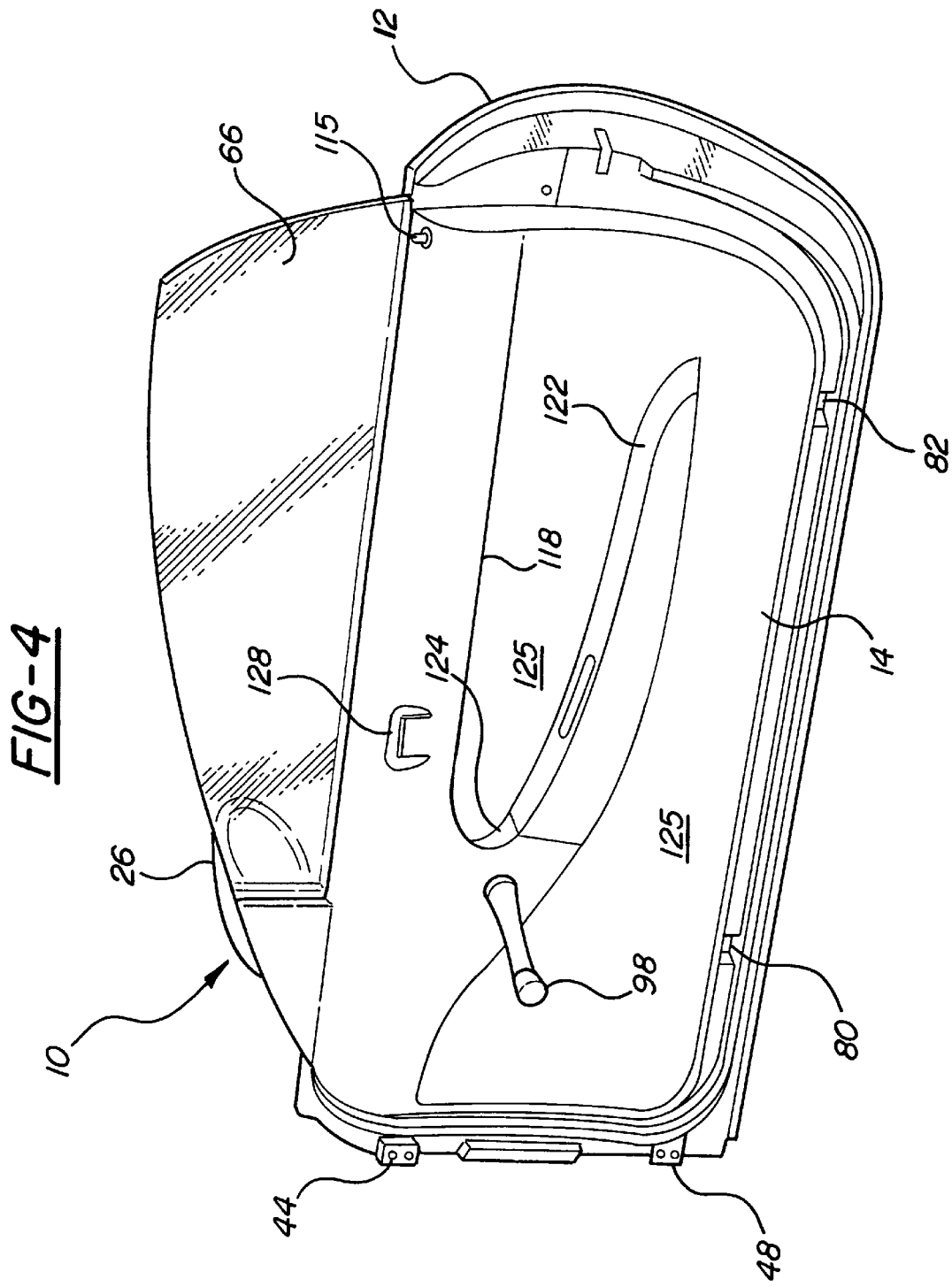
FIG. 4 is a perspective view of the assembled door.

As shown in FIG. 3, a trim member 118, including an inner glass and belt seal assembly 120, is mounted along the length of the upper portion of the inner panel 14 and over the upwardly extending portion 28 of the inner door and belt reinforcement member 18. An armrest assembly 122 (FIGS. 3 and 4) abuts against a front lower portion 124 of the trim member 118, to extend rearwardly along a mid portion of the inner panel 14. As shown in FIG. 1, FIGS. 1A and 1B and apparent from FIGS. 2 and 3, the trim member 118 and the armrest assembly 122 are fitted onto the areas of the inner panel 14 adjacent the exposed inner trim surface 125 integrally molded into the inner panel 14 surfaces in any suitable manner. The molding operation may be injection molding, squeeze molding, or a soft material under pressure. As such any desired grain configuration, or a texture may be formed as the exposed surface 125 of the inner panel 14.

The crank arm stem 97 extends through an opening 126 (FIG. 3) formed in the front lower trim portion 124. An inside door release handle 128 of the handle assembly 104 extends; through a second opening 130 (FIG. 3) formed in the trim panel. 118. A latch cover 132 (FIG. 3) is secured by a fastener 134 to the upper rear end wall 38 of the inner panel 14.

More specifically, as shown in FIG. 2A, the inner integrally molded grain or texture trim surface 125 includes two sections, wherein a first section is formed to include a lower substantially vertical portion 135, an inside radius 136, and an outer curved portion 138 extending to a corner 140. A second trim surface 125 section includes a smaller inside radius 142, and a substantially vertical portion 144. Inbetween the corner 140 and the inside radius 142, a horizontal portion 146 and a substantially vertical portion 148 are molded smooth, i.e., non-grained and non-textured, serving to support the armrest assembly 122. Above the portion 144, either one (FIG. 2B) or two (FIG. 2A) inside corners 149, a vertical portion 150, and a further inside corner 152 serve to support the upper trim member 118.

Industrial Applicability

It should be apparent that the invention provides an improved vehicle door assembly including the following features:

a. all hardware can be loaded from outside the door;

b. the glass and regulator assembly is loaded through the belt opening;

c. less time is required for assembly and service;

d. there is easy access to latch, outside handle, key cylinder and linkage through a latch cover mounted on the inside, rear facing of door inner panel;

e. there is easy access to mirror assembly, inside remote handle, and regulator mounting through the belt-line trim panel;

f. the majority of the door trim surface is molded integrally into the door inner panel; and g. a minimal amount of separately applied door trim is required, resulting in reduced weight and cost, and less time required for assembly and service.

While but one embodiment of the invention has been shown and described, other modifications thereof are possible within the scope of the following claims.

What is claimed is:

1. In combination with a vehicle door assembly including an outer contoured panel, and an inner contoured panel, the panels being connected at their side and bottom peripheral edges, the improvement comprising a trim surface having a grain or texture integrally molded into a portion of the inner surface of said inner contoured panel, wherein a first lower section of said inner contoured panel and its integrally molded trim surface includes a first substantially vertical portion extending from adjacent the bottom peripheral edge to a first inside radius connecting with an outer curved portion terminating at a corner, and a second upper section includes a second inside radius connected to a second substantially vertical portion; horizontal and vertical segments of said inner panel extending serially between said corner and said second inside radius adapted to receive an armrest, and at least one inside corner and a substantially vertical segment of said inner panel extending above the upper end of said second substantially vertical portion to the upper edge of said inner contoured panel adapted to receive a separate upper trim member.

2. In combination with a vehicle door assembly including an outer contoured panel, and an inner contoured panel, the panels being connected at their side and bottom peripheral edges, the improvement comprising a trim surface having a grain or texture integrally molded into a portion of the inner surface of said inner contoured panel, wherein a first lower section of said inner contoured panel and its integrally molded trim surface includes a first configuration extending upwardly from adjacent the bottom peripheral edge to a first corner, and a second upper section of said inner contoured panel and its integrally molded trim surface being spaced apart from said corner and including a second configuration extending upwardly to a second corner; horizontal and vertical segments of said inner panel extending serially between said first corner and the lower end of said second upper section adapted to receive an armrest, and at least one inside corner and a substantially vertical segment of said inner panel extending above the upper end of said second upper section to the upper edge of said inner contoured panel adapted to receive a separate upper trim member.

3. A vehicle door assembly comprising an outer contoured panel, an inner contoured panel, the panels being connected at their side and bottom peripheral edges, wherein an exposed trim surface is integrally molded into the inner surface of said inner contoured panel as a substantial portion thereof, and a separate trim element secured to the inner panel surface along an upper edge portion, and an arm rest assembly secured to the inner panel surface at a central portion thereof, supplementing said integrally molded exposed trim surface, wherein said separate trim element includes a front lower portion extending downwardly therefrom, and an end of said armrest abuts against said front lower portion.

4. A vehicle door assembly comprising an outer contoured panel, an inner contoured panel, the panels being connected at their side and bottom peripheral edges, wherein an exposed trim surface is integrally molded into the inner surface of said inner contoured panel as a substantial portion thereof, and a separate trim element secured to the inner panel surface along an upper edge portion, and an arm rest assembly secured to the inner panel surface at a central portion thereof, supplementing said integrally molded exposed trim surface, wherein said separate trim element includes a front lower portion extending downwardly therefrom, and an end of said armrest abuts against said front lower portion, and first aligned openings formed through said inner door panel and said front lower portion of said separate trim panel for the extension therethrough of a stem of a crank assembly, and second aligned openings formed through said inner door panel and said separate trim panel for the extension therethrough of an inside door release handle assembly.

5. A vehicle door assembly comprising an outer contoured panel, an inner contoured panel, the panels being connected at their side and bottom peripheral edges, wherein an exposed trim surface is integrally molded into the inner surface of said inner contoured panel as a substantial portion thereof, and a separate trim element secured to the inner panel surface along an upper edge portion thereof, and an arm rest assembly secured to the inner panel surface at a central portion thereof, supplementing said integrally molded exposed trim surface.

* * * * *